United States Patent [19]
Ceaton

[11] Patent Number: 5,116,500
[45] Date of Patent: May 26, 1992

[54] PORTABLE POTABLE WATER PURIFIER KIT

[75] Inventor: Peter F. Ceaton, Great Falls, Mont.

[73] Assignee: Aquarian Water Co., Great Falls, Mont.

[21] Appl. No.: 684,756

[22] Filed: Apr. 15, 1991

[51] Int. Cl.$^5$ .............................. B01D 24/20
[52] U.S. Cl. ...................... 210/238; 210/282; 210/473; 210/494.1; 210/494.2; 210/494.3
[58] Field of Search .............. 210/266, 282, 494.1, 210/494.2, 494.3, 474, 475, 476, 473, 238

[56] References Cited

U.S. PATENT DOCUMENTS

| | | |
|---|---|---|
| 341,068 | 5/1886 | Smith . |
| 347,432 | 8/1886 | Luce ........................ 210/476 |
| 601,785 | 4/1898 | Wireback ................. 210/494.2 |
| 651,948 | 6/1900 | Lawson . |
| 740,366 | 9/1903 | Knight . |
| 987,360 | 3/1911 | Harrington ............... 210/476 |
| 1,120,229 | 12/1914 | Nieman ..................... 210/474 |
| 1,140,727 | 5/1915 | Warden ..................... 210/476 |
| 1,157,776 | 10/1915 | Hagg ......................... 210/282 |
| 1,267,417 | 5/1918 | Jones ......................... 210/476 |
| 1,674,203 | 6/1928 | Holz et al. . |
| 2,083,546 | 6/1937 | Aldham ..................... 210/453 |
| 2,518,831 | 7/1946 | Stallock et al. . |
| 2,525,330 | 10/1950 | Zaun ......................... 210/494.1 |
| 2,796,989 | 6/1957 | Kovacs . |
| 2,808,154 | 10/1957 | Scott . |
| 3,268,444 | 8/1966 | Renn . |
| 3,327,859 | 6/1967 | Pall . |
| 3,334,574 | 8/1967 | Douglas . |
| 3,415,384 | 12/1968 | Kasten ..................... 210/494.3 |
| 3,807,570 | 4/1974 | Allan ........................ 210/494 |
| 3,962,097 | 6/1976 | Reiman et al. ........... 210/494.3 |
| 4,016,080 | 5/1977 | Williams . |
| 4,316,938 | 2/1982 | Slusarczuk et al. . |
| 4,800,018 | 1/1989 | Moser . |
| 4,938,869 | 7/1990 | Bayerlein et al. ........ 210/494.1 |
| 4,990,254 | 2/1991 | Toida et al. ............... 210/476 |
| 4,999,109 | 3/1991 | Sabre ........................ 210/282 |
| 5,006,246 | 4/1991 | Edwards et al. ......... 210/282 |

*Primary Examiner*—Peter Hruskoci
*Assistant Examiner*—Cynthia L. Nessler
*Attorney, Agent, or Firm*—Wheeler Law Firm

[57] ABSTRACT

A liquid filtration device having a collapsible funnel, a multi-turn spiral filter path, and a cup for storing the liquid and for storing the funnel and filter when not in use so that a compact storable transportable unit with a long filtration path is achieved.

18 Claims, 3 Drawing Sheets

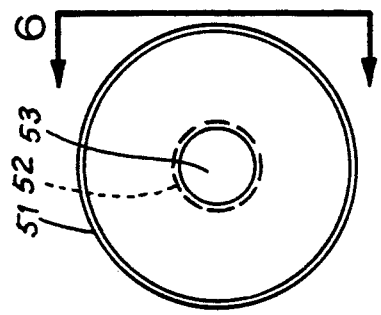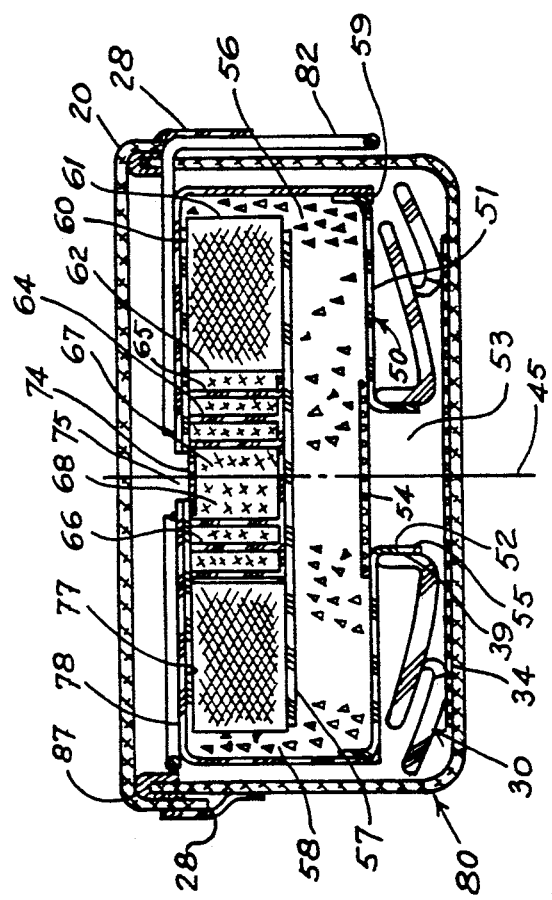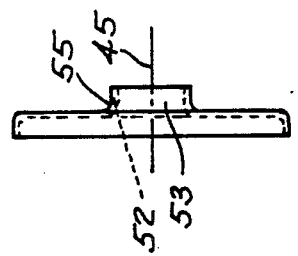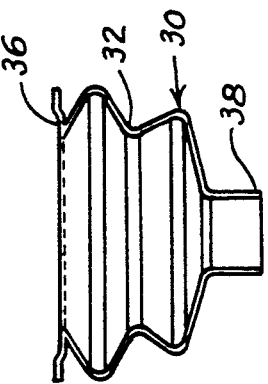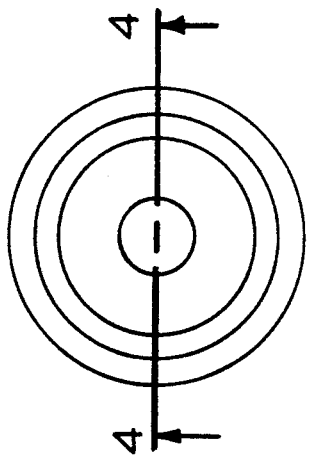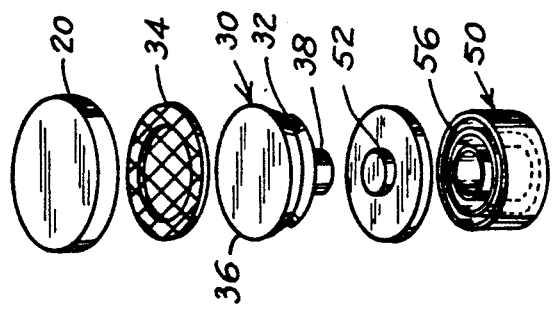

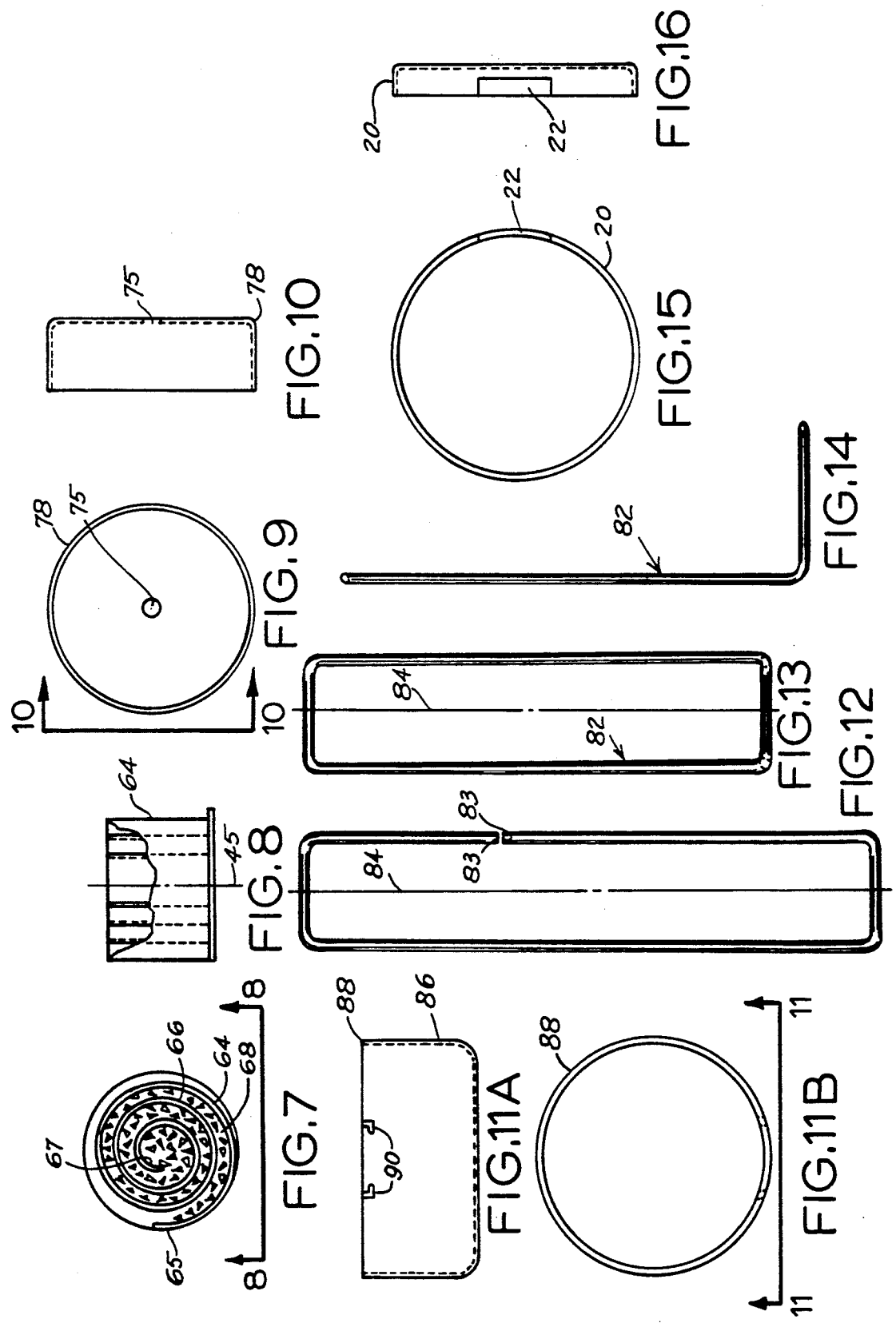

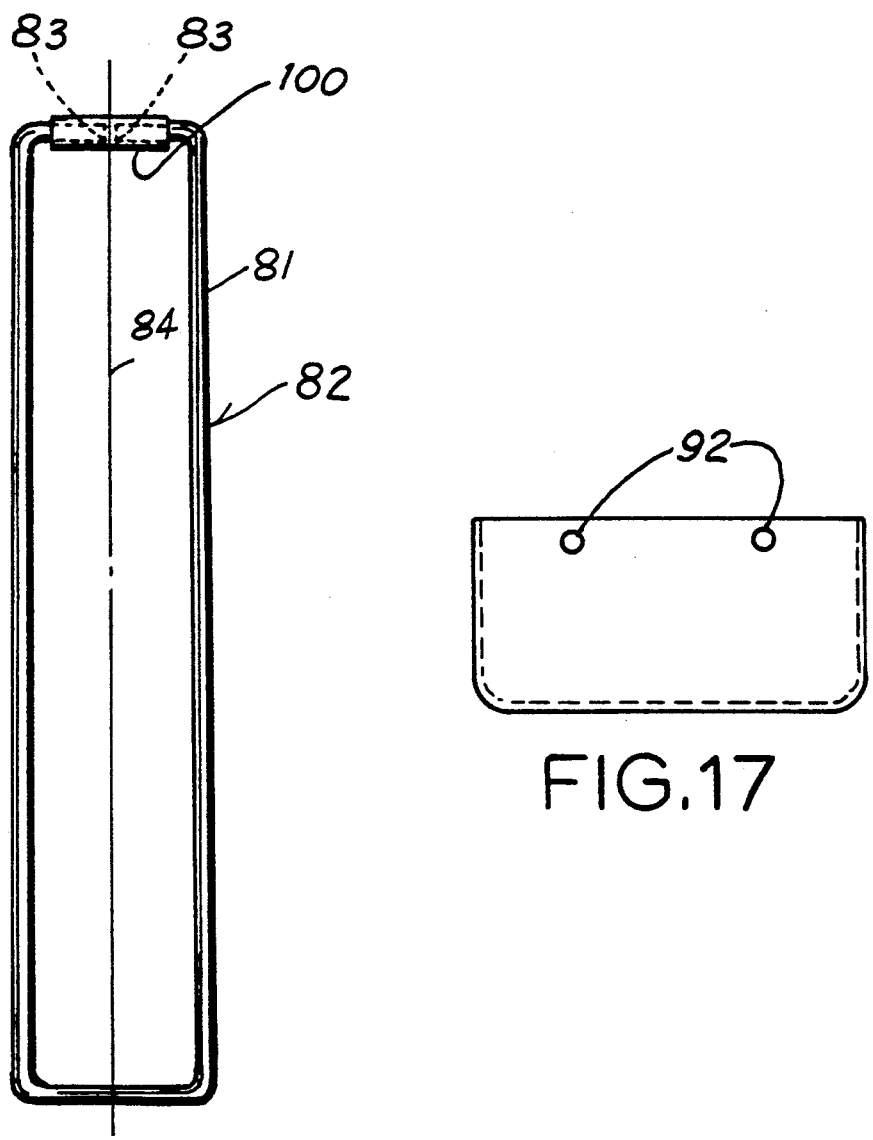

PORTABLE POTABLE WATER PURIFIER KIT

BACKGROUND OF THE INVENTION

The instant invention relates to a liquid purifier which is small enough to fit in a person's pocket yet effective enough to produce drinkable water from natural sources such as swamps which contain water which is not drinkable without treatment. The heart of the idea involves a nested arrangement of parts which provides a very effective filter. A part of this filter has an innovative spiral filtration path into which filtration material is placed. This spiral filtration path forces the water to travel along a much longer path than a conventional filter occupying the same amount of space. This unique and simple design increases the contact time between the liquid and the filtration material thereby increasing filter performance. This filter is also designed so that it is capable of being rearranged to fit inside of a can inside the user's pocket.

While many devices for filtering liquid are known, none are known to the inventor which are collapsible for carrying and which utilize, among other things, a unique spiral filtration path. For example, U.S. Pat. No. 651,948 (Lawson), U.S. Pat. No. 1,674,203 (Holz), U.S. Pat. No. 2,808,154 (Scott), U.S. Pat. No. 3,327,859 (Pall), and U.S. Pat. No. 4,800,018 (Moser) disclose portable water purification systems which utilize a centrally located filter. However, the filtration path of the water is substantially vertical as gravity pulls the liquid through the filtration material. In addition, none of the previously referenced patents disclose a reservoir mechanism which may be used as both a drinking cup and a small saucepan. U.S. Pat. No. 3,268,444 (Renn) and U.S. Pat. No. 4,316,938 (Slusarczuk) disclose filtration materials but utilize only conventional vertical filtration paths. U.S. Pat. No. 2,796,989 (Kovacs) shows a filtration material arrangement, but again this arrangement utilizes only a conventional vertical filtration path. U.S. Pat. No. 341,066 (Smith) and U.S. Pat. No. 2,518,831 (Stalloch) disclose liquid filtration units with components capable of nesting within each other. However, both designs require conventional vertical filtration paths. U.S. Pat. No. 740,366 (Knight), U.S. Pat. No. 3,334,574 (Douglas), and U.S. Pat. No. 4,016,080 show liquid filtration units utilizing substantially linear filtration paths which deviate from the conventional vertical filtration path. Hence, none of the prior art teaches or shows the unique and simple design of the instant invention.

SUMMARY OF THE INVENTION

The invention consists essentially of a unique filtration structure in combination with a filtration device for filtering liquid. The filtration structure comprises containment means for containing liquid, liquid filtration means having at least one multiple turn spiral portion, and guiding means for guiding liquid to the beginning of the filtration means. The guiding means are capable of nesting within the containment means. The filtration means are also capable of nesting within the containment means such that a compact unit with a long filtration path is achieved.

DESCRIPTION OF THE DRAWINGS

FIG. 1 is a perspective view of the liquid filtration device in its operational configuration.

FIG. 2 is a horizontal sectional view of the liquid filtration device in its storage configuration.

FIG. 3 is an elevational view of the funnel assembly.

FIG. 4 is a horizontal sectional view of the funnel assembly.

FIG. 5 is an elevational view of the cover of the liquid filtration device.

FIG. 6 is a side view of the cover of the liquid filtration device.

FIG. 7 is an elevational view of the spiral unit.

FIG. 8 is a horizontal sectional view of the spiral unit.

FIG. 9 is an elevational view of the filter case.

FIG. 10 is a sectional view on line 10—10 of the filter case.

FIG. 11A is a horizontal sectional view on line 11—11 of the cup of the liquid filtration device.

FIG. 11B is an elevational view of the cup of the liquid filtration device.

FIG. 12 is an elevational view of the handle of the liquid filtration device before bending.

FIG. 13 is an elevational view of the handle of the liquid filtration device after bending.

FIG. 14 is a side view of the handle of the liquid filtration device.

FIG. 15 is an elevational view of the cover of the liquid filtration device.

FIG. 16 is a side view of the cover of the liquid filtration device.

FIG. 17 is a horizontal sectional view of the alternative embodiment of the cup of the liquid filtration device.

FIG. 18 is an elevational view of the alternative embodiment of the handle of the liquid filtration device before bending.

DETAILED DESCRIPTION

Although the disclosure hereof is detailed and exact to enable those skilled in the art to practice the invention, the physical embodiments herein disclosed merely exemplify the invention which may be embodied in other specific structure. While the preferred embodiment has been described, the details may be changed without departing from the invention, which is defined by the claims.

The liquid filtration device as a whole is referred to as the unit 10 in this description. The unit 10 is comprised of cover 20, funnel assembly 30, filter assembly 50, and cup assembly 80.

As disclosed in FIGS. 1 and 2, funnel assembly 30 and filter assembly 50 are capable of nesting within cup assembly 80 and cover 20. FIG. 1 shows the liquid filtration unit 10 in its operational configuration, while FIG. 2 shows the liquid filtration unit 10 in its storage configuration. It should be noted that filter assembly 50 and funnel assembly 30 are inverted for storage within cup assembly 80. Cover 20 is capable of being frictionally engaged with cup assembly 80. Cover 20 and cup assembly 80 are preferably aluminum although other materials may be used. While asymmetric configurations, given this disclosure, would be readily apparent to one skilled in the art, cover 20, funnel assembly 30, and filter assembly 50 are generally symmetric about axis 45.

FIGS. 1, 3, and 4 show funnel assembly 30 which is comprised of funnel body 32, funnel inlet screen 34, funnel inlet end 36, and funnel outlet 38. Liquid enters funnel assembly 30 through funnel inlet screen 34. Funnel inlet screen 34 (and all screens referred to in this description) is preferably comprised of polyethylene screen material having equivalent 0.018 inch diameter circular or square openings. Funnel inlet screen 34 is placed over funnel inlet end 36. This configuration allows any relatively large particulate matter to be removed from the liquid by funnel inlet screen 34 before the liquid enters funnel inlet end 36. Liquid passes through funnel inlet end 36 and travels through funnel body 32. Funnel body 32 narrows the diameter of the liquid flow and guides it to funnel outlet 38. Funnel outlet inner perimeter 39 of funnel outlet 38 is sized for a friction fit with filter inlet outer perimeter 55 of filter inlet 52. The liquid exits funnel assembly 30 through funnel outlet 38 and passes directly into filter assembly 50.

As disclosed by FIGS. 1 and 2, filter assembly 50 is comprised of filter cover 51, filter inlet 52, filter inlet screen 54, finely divided anthracite 56, diverter gasket 57, ion exchange material 58, filter segment 60, spiral 64, activated carbon 68, outlet screen 74, outlet gasket 77, and filter case 78. Liquid enters filter assembly 50 through filter inlet 52. As shown in FIGS. 5 and 6, filter inlet 52 is the raised collar portion of filter cover 51 having an aperture 53 through which liquid can flow. Liquid passes through aperture 53 and encounters filter inlet screen 54. Filter inlet screen 54 retains all large particulate matter while allowing the liquid to pass through. The liquid then passes through anthracite 56 which retains some of the impurities which were contained in the liquid. Next, the liquid encounters diverter gasket 57 which diverts the liquid to the ion exchange material 58. Diverter gasket 57 (and all other gaskets referred to in this description) is preferably nitrile rubber. Also, a standard RTV seal 59 is used on the cover to the filter case 78. Alternatively, other flexible and elastic materials approved for contact with potable liquids may also be used. The ion exchange material 58 is comprised of material such as Rohm & Haas #IRA-410 or #IR-120 which is capable of exchanging ions with fluid. The ion exchange material 58 is located between filter case 78 and filter segment outer perimeter 61 of filter segment 60 as shown in FIG. 2. The ion exchange material 58 removes dissolved minerals from the liquid. After passing through the ion exchange material 58, the liquid enters the filter segment 60 through filter segment outer perimeter 61.

Filter segment 60 is preferably a donut-shaped filter with a substantially horizontal filtration path such as Cuno #AP-109 and is comprised of a foraminous material which further filters the liquid. The liquid exits filter segment 60 through filter segment inner perimeter 62. After the liquid passes through filter segment inner perimeter 62 of filter segment 60, it enters the unique spiral unit 64. As disclosed by FIGS. 2, 7, and 8, spiral unit 64 is comprised of spiral inlet 65, spiral body 66, and spiral outlet 67. Spiral unit 64 is preferably made of a sheet of polyethylene which has been rolled to form a spiral. Activated carbon 68 is poured into the turns of spiral body 66. The already filtered liquid enters spiral unit 64 through spiral inlet 65. The liquid flows through spiral inlet 65 into spiral body 66 where the liquid encounters activated carbon 68 and is filtered (or adsorbed) again. The spiral shape of spiral body 64 forces the liquid to travel a longer path than the conventional linear filter path found in other filters. This longer path allows more filtration to be performed in a smaller space than previous designs have allowed. The liquid travels from spiral inlet 65 through the turns of spiral body 66 to spiral outlet 67. Spiral outlet 67 is located along centerline axis 45.

The liquid passes through spiral outlet 67 where it encounters outlet screen 74. Outlet gasket 77 ensures that no void exists between filter case 78 and outlet screen 74, spiral unit 64, and filter segment 60. Outlet screen 74 retains large particulate matter such as activated carbon 68 while allowing the liquid to travel through to outlet aperture 75 of filter case 78 as shown in FIGS. 9 and 10. The liquid travels through outlet aperture 75 and drops into cup assembly 80 (as shown in FIG. 1) where it is contained. Virtually all of the impurities in the liquid have now been removed by the liquid filtration device, thereby yielding drinkable water in cup assembly 80.

Cup assembly 80 is comprised of handle 82, cup 86, and cup edge gasket 87. Cup edge gasket 87 is formed in the shape of a continuous U-shaped ring as disclosed by FIG. 2. Cup edge gasket 87 is backed with adhesive and is frictionally engaged with cup edge perimeter 88 as shown in FIGS. 2, 10, and 11. This configuration seals the void between cover 20 and cup edge perimeter 88, thus preventing undesired materials from entering the liquid filtration device 10 when it is in its storage mode.

As disclosed in FIG. 11A, two L-shaped notches 90 are milled into cup edge perimeter 88. Notches 90 are slidably engaged with handle 82. This slidable engagement allows most of handle 82 to be contained within cup 86 for storage, while allowing handle 82 to be extended away from cup edge perimeter 88 for use as a handle when the fluid filtration unit is in its operational configuration. Handle 82 is preferably comprised of stainless steel wire which is bent to form rectangle 81 as shown in FIG. 12. The wire ends 83 are welded together so that rectangle 81 has a continuous perimeter. As shown in FIGS. 13 and 14, rectangle 81 is bent ninety degrees from the longitudinal axis 84 to form a better shape for holding the cup 86.

Alternatively, two small holes 92 are drilled into cup edge perimeter 88 (as shown in FIG. 17). Holes 92 are slidably engaged with handle 82. This slidable engagment also allows most of handle 82 to be contained within cup 86 for storage, while allowing handle 82 to be extended away from cup edge perimeter 88 for use as a handle when the fluid filtration units is in its operational configuration. Handle 82 is preferably comprised of stainless steel wire which is bent to form rectangular 81 as shown in FIG. 18. The wire ends 83 are inserted into a metal or teflon sleeve 100 so that rectangle 81 has a continuous perimeter. In this embodiment, rectangle 81 is also bent ninety degrees from the longitudinal axis 84.

FIGS. 15 and 16 disclose cover notch 22 which is located on cover 20. Cover notch 22 allows cover 20 to fit over handle 82 as shown in FIG. 2. Rubber band 28 is nitrile rubber or another flexible and elastic material and is used to retain handle 82 in the liquid filtration unit's stored configuration.

The above described embodiments of this invention are merely descriptive of its principles and are not to be limiting. The scope of this invention instead shall be determined from the scope of the following claims, including their equivalents. For the purpose of the following claims, a spiral is defined (in addition to its common meaning) as substantially a gyre lying generally within one plane.

What is claimed is:

1. In combination with a liquid filtration device capable of operating at standard atmospheric pressure, a filtration structure comprising:
   containment means for containing liquid;
   filtration means having at least one portion being bounded by a liquid impermeable wall forming a multiple-turn radial spiral from a first outside end to a second inside end and having filtration media means between the turns of said wall, for filtering such a liquid;
   said first outside end being located radially away from said second inside end;
   guiding means for guiding liquid to one end of said multiple turn spiral filtration means;
   said guiding means being capable of nesting within said containment means;
   said guiding means including a funnel mechanism capable of collapsing;
   said funnel mechanism having a discharge opening;
   said filtration means being capable of nesting within said containment means, whereby a compact unit with a long filtration path is achieved.

2. The device of claim 1 in which said filtration media means includes activated carbon.

3. The device of claim 1 in which:
   said filtration is essentially spiral over its length and contains filtration media for filtering a liquid;
   at least one portion of said filtration media being contained in at least one portion of said filtration means;
   whereby liquid travels through said filtration material in said filtration means and is filtered.

4. The device of claim 1 in which:
   said filtration means is comprised of plastic.

5. The device of claim 1 in which said guiding means substantially comprises a funnel mechanism having an enlarged inlet end to receive water, said guiding means being storable in said containment means and supportable above said filtration means while in use.

6. The device of claim 1, further comprising:
   at least one liquid filter;
   said liquid filter being placed essentially in series with said filtration means;
   whereby liquid flowing through said filtration device travels through said liquid filter and said filtration means and is filtered.

7. The device of claim 1, further comprising:
   cover means for covering said filtration means;
   said cover means being constructed so as to achieve a friction fit with said containment means.

8. A filtration device for filtering water, comprising:
   containment means for containing water;
   handle means for holding said containment means;
   cover means for covering said containment means;
   filtration means for filtering water; and
   guiding means for guiding water to said filtration means;
   said containment means and said cover means being large enough to contain said filtration means and said guiding means;
   said containment means being slidably engageable with said handle means;
   said guiding means including a funnel mechanism capable of collapsing;
   said funnel mechanism having a discharge opening;
   said filtration means comprising:
   a filter cover having a filter inlet,
   a filter inlet screen,
   a quantity of finely divided anthracite,
   a diverter gasket,
   a quantity of ion exchange material,
   a filter segment including a spirally wound water impervious material and a quantity of activated carbon,
   an outlet screen,
   an outlet gasket, and
   a filter case containing an outlet aperture;
   said filtration means being disposed within said containment means;
   said guiding means being disposed within said containment means;
   said guiding means being located above said filtration means and below said filtration cover means;
   said handle means being slidably engageable with said containment means;
   said discharge opening of said funnel mechanism being frictionally fitted to said filter inlet of said filter cover;
   said filter cover being frictionally engaged with said filter case;
   the filter inlet screen being located substantially under said filter cover;
   the anthracite being located substantially under said filter inlet screen and substantially above said diverter gasket;
   said diverter gasket being made of water-impervious material that is substantially circular in shape and has a diameter slightly less than the diameter of said filtration means;
   said diverter gasket being located substantially on top of the filter segment and said spirally wound material, so that water is forced to travel to the outer perimeter of the filter segment;
   the ion exchange material being located substantially along the outer perimeter of the filter segment;
   the filter segment being generally ring-shaped;
   the filter segment being capable of accepting water inflow at its outer perimeter and discharging water at its inner diameter;
   said spirally wound material being located substantially within the inner diameter of the filter segment;
   said spirally wound material being comprised of material which is impervious to water;
   said spirally wound material containing the quantity of activated carbon;
   said spirally wound material and filter segment being seated upon said outlet gasket which is seated upon the bottom of said filter case;
   said outlet gasket having an opening at its center in which said outlet screen is placed;
   said outlet aperture of said filter case being located at the center of the bottom of said filter case;
   whereby water entering said guiding means is guided to said filtration means where the water flows through the filter inlet screen and the anthracite and is diverted to the ion exchange material and subsequently the filter segment and said spirally wound material where the water encounters the activated carbon and is filtered, whereupon the water exits said spirally wound material at said outlet screen and exits the filter case through the outlet aperture in said filter case, whereupon the water falls into said containment means and is stored.

9. The device of claim 8 in which said containment means, said handle means, and said cover means are comprised of metal.

10. The device of claim 8 in which said funnel mechanism is comprised of ethylene propylene rubber.

11. The device of claim 8 in which said funnel mechanism is comprised of silicone.

12. The device of claim 8 in which said handle means is comprised of stainless steel wire.

13. The device of claim 8 in which said filter cover and filter case are comprised of polyethylene.

14. The device of claim 8 in which said filter cover and filter case are comprised of polypropylene.

15. The device of claim 8 in which said filter cover and filter case are comprised of polystyrene.

16. The device of claim 8 in which said filter cover and filter case are comprised of metal.

17. The device of claim 8 in which said handle means is retractable within the containment means.

18. The device of claim 8 in which said handle means is retractable.

* * * * *